US006839679B1

(12) United States Patent
Lynch et al.

(10) Patent No.: US 6,839,679 B1
(45) Date of Patent: *Jan. 4, 2005

(54) AUTOMATED TRAVEL PRICING SYSTEM

(75) Inventors: Michael F. Lynch, Dallas, TX (US); Jonathan A. Turner, Plano, TX (US)

(73) Assignee: Electronic Data Systems Corporation, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 885 days.

(21) Appl. No.: 08/618,005

(22) Filed: Mar. 18, 1996

(51) Int. Cl.7 .............................................. G06F 17/60
(52) U.S. Cl. ........................................................ 705/5
(58) Field of Search ............................ 709/9, 6; 705/5, 705/6

(56) References Cited

U.S. PATENT DOCUMENTS

| | | | | | |
|---|---|---|---|---|---|
| 4,862,357 A | * | 8/1989 | Ahlstrom | .................... | 364/407 |
| 4,922,439 A | * | 5/1990 | Greenblatt | ..................... | 705/6 |
| 4,931,932 A | * | 6/1990 | Dalnekoff | ................... | 364/407 |
| 5,021,953 A | * | 6/1991 | Webber | ....................... | 364/407 |
| 5,191,523 A | * | 3/1993 | Whitesage | .................. | 364/407 |
| 5,237,499 A | * | 8/1993 | Garback | ...................... | 364/407 |
| 5,253,166 A | * | 10/1993 | Dettlebach | ................. | 364/407 |
| 5,255,184 A | * | 10/1993 | Hornick | ...................... | 364/407 |
| 5,309,355 A | * | 5/1994 | Lockwood | ................... | 364/401 |
| 5,331,546 A | * | 7/1994 | Webber et al. | ................ | 705/6 |
| 5,422,809 A | * | 6/1995 | Griffin | ........................ | 364/407 |
| 5,553,280 A | | 9/1996 | Fortier | ....................... | 395/600 |
| 5,570,283 A | * | 10/1996 | Shoolery | ..................... | 364/407 |
| 5,586,312 A | | 12/1996 | Johnson et al. | ............. | 395/610 |
| 5,644,721 A | * | 7/1997 | Chung | ........................ | 395/206 |
| 5,648,900 A | * | 7/1997 | Bowen | ....................... | 395/207 |
| 5,732,398 A | * | 3/1998 | Tagawa | ......................... | 705/5 |
| 5,781,892 A | * | 7/1998 | Hunt et al. | .................... | 705/5 |
| 5,832,451 A | * | 11/1998 | Flake et al. | .................... | 705/5 |
| 5,832,453 A | * | 11/1998 | O'Brien | .......................... | 705/6 |
| 5,832,454 A | * | 11/1998 | Jafri et al. | ..................... | 705/6 |
| 5,835,716 A | * | 11/1998 | Hunt et al. | ............ | 395/200.43 |
| 5,839,114 A | * | 11/1998 | Lynch et al. | .................... | 705/5 |
| 5,897,620 A | * | 4/1999 | Walker et al. | .................. | 705/5 |

FOREIGN PATENT DOCUMENTS

| | | | | |
|---|---|---|---|---|
| EP | 0 690 398 A1 | 1/1996 | .......... | G06F/17/60 |
| JP | 7092649 | * 4/1995 | ............ | G03F/1/00 |
| WO | WO 93/10502 | 5/1993 | .......... | G06F/15/26 |

OTHER PUBLICATIONS

Dialog® file 610, Business Wire, No. 46868, "COVIA Corp: Covia Corp. Introduces FOCALPOINT; First Travel Agency Application of IBM Personal–System 2", 3 pages, dated Apr. 2, 1987.

Mary Brisson, "Covia E–Mail Offers Shortcut for Agencies", Business Travel News, p. 1, dated Nov. 2, 1992.

Danna K. Henderson, "Computer Reservations System Plunge into the PC Era. (Personal Computers)", Air Transport World, v. 25, n. 8, p 47(6) dated Aug. 1988.

Database IAC Newsletter on Dialog, Worldwide Videotex Update, v.9, No. 7, entitled "VIA Announces 1990 Awards", dated Jul. 1990.

* cited by examiner

*Primary Examiner*—James W. Myhre
(74) *Attorney, Agent, or Firm*—Baker Botts, L.L.P.

(57) ABSTRACT

An automated pricing system (10) is provided. The system (10) obtains inventory information, specifying the rates and/or availability of a plurality of travel arrangements, from one or more computer reservation systems (24). The inventory information is stored in a database (14) along with one or more portfolios of information (relating to a travel agency and each business entity customer of the travel agency) that can be used to discount the listed rates of the travel arrangements. In response to a specific travel itinerary from a customer, the system (10) automatically retrieves the inventory and/or discount information from the database (14) and determines the lowest-priced, available travel arrangements conforming to the itinerary. Consequently, a travel agent using the system (10) does not have to spend time manually determining the lowest-priced travel arrangements.

18 Claims, 2 Drawing Sheets

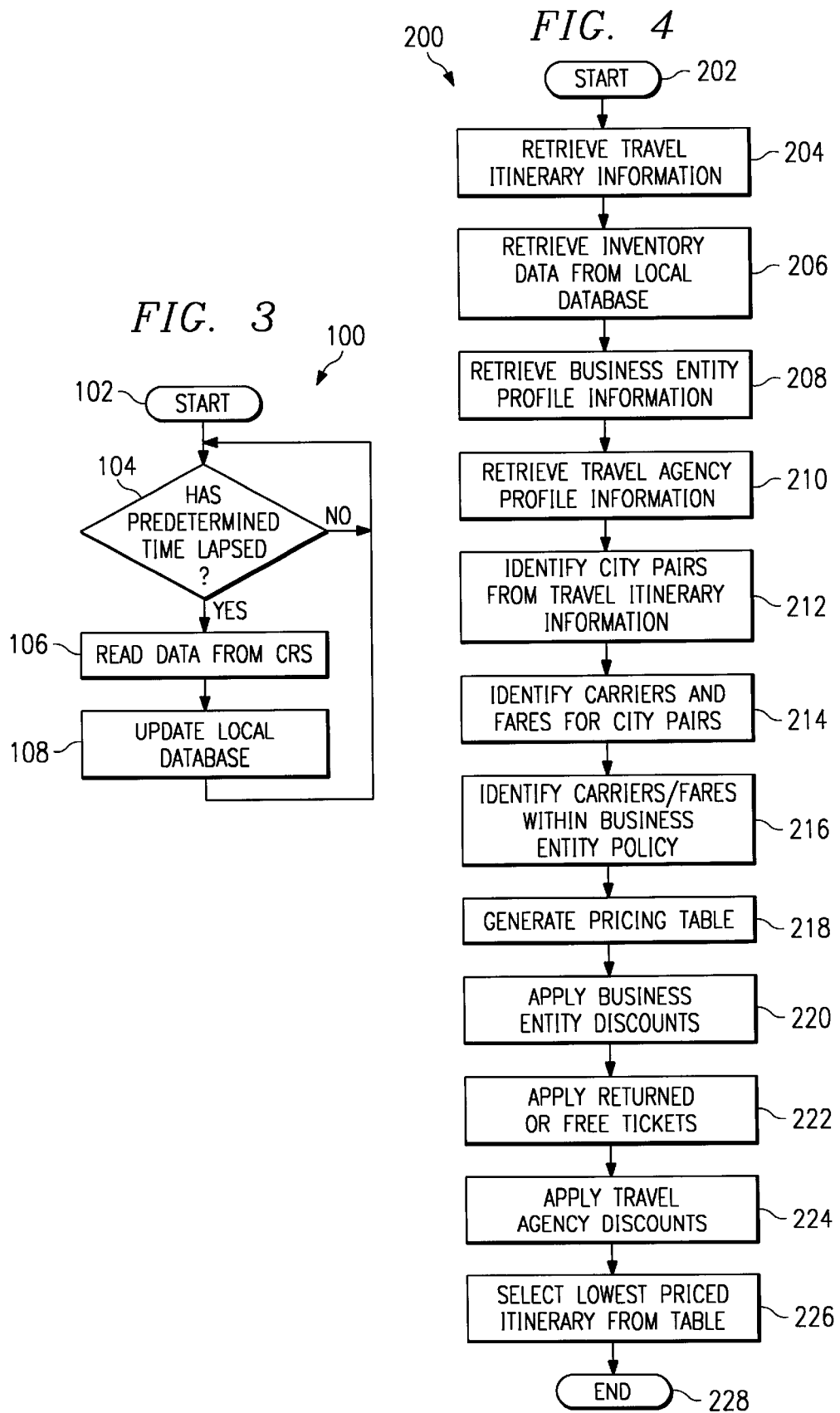

AUTOMATED TRAVEL PRICING SYSTEM

RELATED APPLICATIONS

This application is related to co-pending Application Ser. No. 08/609,034, entitled Automated Travel Planning System, and co-pending application Ser. No. 08/610,107, entitled Automated System for Identifying Alternate Low-Cost Travel Arrangements, both filed on Feb. 29, 1996. This application is also related to U.S. Pat. No. 5,839,114, entitled Automated System for Selecting an Initial Computer Reservation System, which issued on Nov. 17, 1998, from application Ser. No. 08/609,040, filed on Feb. 29, 1996.

TECHNICAL FIELD OF THE INVENTION

This invention relates generally to the field of travel reservation services, and more particularly, to an automated travel pricing system and method of operation.

BACKGROUND OF THE INVENTION

In many cases, a customer who has a general itinerary for travel will ask a travel agency to find the lowest-priced travel arrangements that conform to the itinerary.

Previously, the process of determining the lowest-priced travel arrangements could only be performed manually by a travel agent, and therefore was extremely time-consuming and inefficient. More specifically, a travel agent was required to access one or more computer reservation systems to obtain inventory information (e.g., availability and/or rates) about all travel arrangements that conformed to the itinerary. If the travel arrangements were work-related, the agent then had to account for any discounts available through the individual customer's employer. Although existing computer reservation systems maintained such employer discount information, the travel agent had to input specialized codes into a computer reservation system to retrieve the information so that the listed rate of the travel arrangements could be discounted accordingly. Afterwards, the travel agent was required to also consider any promotional discounts that were available to the travel agency, such as, for example, space-banked seats, which would also lower the price of a particular travel arrangement. When all applicable discounts had been applied to all available travel arrangements conforming to the itinerary, the travel agent was required to manually compare the discounted rates to identify the lowest-priced arrangements. Since the travel agent could not serve other customers during the above-mentioned steps, the agent's productivity decreased. To make matters worse, this prior process of determining lowest-priced travel arrangements was often repeated at the time of ticketing to ensure that the price originally quoted to the customer was correct.

Furthermore, even though a travel agent could become more efficient in the process with experience, it could not be guaranteed that the process would always produce the lowest-priced travel arrangement. In other words, because so much of the prior process required input and/or calculation by a travel agent, the accuracy of the process was extremely susceptible to human error.

SUMMARY OF THE INVENTION

Accordingly, a need has arisen for a system which automatically determines the lowest-priced, available travel arrangements conforming to a travel itinerary submitted by a customer.

In accordance with the preferred embodiment of the present invention, an automated pricing system is provided. The system obtains inventory information, specifying the rates and/or availability of a plurality of travel arrangements, from one or more computer reservation systems. The inventory information is stored in a database along with one or more portfolios of information (relating to a travel agency and each business entity customer of the travel agency) that can be used to discount the listed rates of the travel arrangements. In response to a specific travel itinerary from a customer, the system automatically retrieves the inventory and/or discount information from the database and determines the lowest-priced, available travel arrangements conforming to the itinerary.

An important technical advantage of the present invention is that a lowest-priced, available travel arrangement is automatically determined so that a travel agent does not have to spend time manually deriving the same.

Another important technical advantage of the present invention is that discounts available to the traveler are automatically considered by the system. Consequently, a travel agent using the system is not required to be knowledgeable of and apply the specialized codes that would otherwise be necessary to identify a lowest-priced travel arrangement.

Yet another important technical advantage of the present invention is that the opportunity for human error in determining a lowest-priced travel arrangement is substantially reduced or eliminated.

BRIEF DESCRIPTION OF THE DRAWINGS

For a better understanding of the present invention, reference may be made to the accompanying drawings, in which:

FIG. 3 is a flow diagram that illustrates a method of operating an automated travel pricing system to obtain inventory information from one or more computer reservation systems, in accordance with the preferred embodiment of the present invention; and FIG. 4 is a flow diagram that illustrates a method of operating an automated travel pricing system to determine a lowest-priced travel arrangement, in accordance with the preferred embodiment of the present invention.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

In accordance with the preferred embodiment of the present invention, an automated travel pricing system is preferably used to identify the lowest-priced, available travel arrangements conforming to any given travel itinerary received from a customer. The automated travel pricing system accesses one or more computer reservation systems in order to obtain inventory information regarding, for example, the availability and listed rates of various travel arrangements such as airline flights, hotel accommodations, and rental cars. The automated travel pricing system also stores other information, such as, for example, travel discounts available to the employees of a business entity, which may be used to reduce the listed rates of travel arrangements. When the automated travel pricing system receives a specific itinerary, it retrieves the above-described information and determines the lowest-priced travel arrangements available conforming to the itinerary. Because the travel pricing system is automated, a travel agent using the system does not need to manually determine the lowest-priced travel arrangements. Consequently, the travel agent is able to work more productively. Furthermore, the travel pricing system substantially reduces or eliminates the opportunity for human error.

The following describes how the method of the present invention can find the lowest-priced fare for airline travel. However, it should be understood that the present invention is not limited to such an exemplary embodiment. Thus, in an alternative embodiment, for example, the present invention could be used to find the lowest-priced hotel accommodations or rental automobile in response to a travel itinerary requesting hotel or rental automobile service, respectively.

Figure 1:
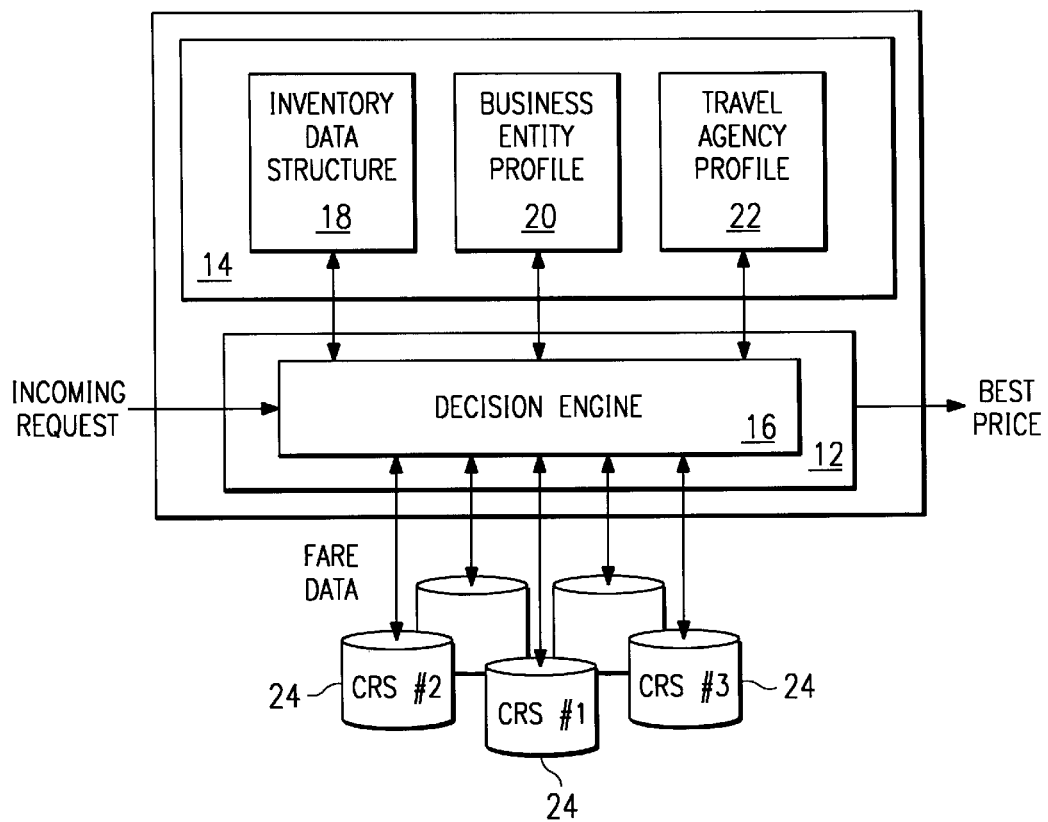
FIG. 1 is a top level, block diagram of an automated travel pricing system, in accordance with a preferred embodiment of the present invention.

FIG. 1 is a top level, block diagram of an automated pricing system 10, in accordance with the preferred embodiment of the present invention. The automated travel planning system (hereinafter, referred to as the "system") 10 includes a processing network 12 connected to a database 14.

Processing network 12 may consist of a single processor, or as described below with reference to FIG. 2, a plurality of interconnected processors. Processing network 12 functions to run one or more software applications or modules, which can include a decision engine module 16.

Decision engine module 16 preferably includes two sub-modules or subroutines. The first sub-module of decision engine module 16, which can be described as an inventory update sub-module, preferably functions to direct system 10 to periodically access and retrieve inventory information from one or more computer reservation systems 24 used by the travel agency. The inventory update sub-module further functions to store the inventory information in database 14. The second sub-module of decision engine module 16, which can be described as an analytical sub-module, preferably operates independently of the inventory update sub-module. The analytical sub-module functions to receive travel request information, which preferably specifies a travel itinerary, and in response, determines the lowest-priced travel arrangement available that conforms to the itinerary. For example, in response to a travel request for an airline flight between Dallas and Chicago on April 25th, decision engine module may determine (and report) that an American Airlines flight would cost the least amount of money for all the available flights on that date between the specified cities. Decision engine module 16 preferably uses case-based reasoning (discussed in more detail below) in its analysis. The operation of decision engine module 16 is described below in more detail with reference to FIG. 4.

Database 14 is preferably a relational database, which resides in a data storage medium (to be described in detail below). A business entity profile 20 is preferably maintained in the relational database 14 in system 10, for each business entity customer of the agency. In addition, the relational database preferably maintains an inventory data structure 18 and a travel agency profile 22.

Inventory data structure 18 includes inventory information obtained from one or more computer reservation systems 24 used by the travel agency. The customer reservation systems 24 provide travel service inventory information, such as airline flight, hotel, and rental automobile availability and rates. For airline flights, the inventory information may specify, for example, all flights between each particular city of departure and city of destination (otherwise known as a "city pair"), the airline carriers providing such flights, a description of each flight as either direct or non-direct, the breakdown of all non-direct flights into separate legs or "segments," the identification of each segment of a flight as either domestic or international, the fare classes available on the flights, and pricing information (e.g., one-way ticketing, round-trip ticketing, city-to-city ticketing, or end-to-end ticketing) that can be used to determine the rates of various flights.

Business entity profile 20 preferably contains, at a minimum, information that is used to determine any discounts available to a traveler as an employee of a particular business entity customer of the travel agency. Thus, the business entity profile information may include the specialized codes used on each computer reservation system to discount the listed rate of travel arrangements for employees of the business entity. In addition, business entity profile 20 preferably contains information regarding restrictions, such as, for example, fare class restrictions, that a business entity customer may impose upon its employees for work-related travel. Furthermore, business entity profile 20 can contain other information that can be used to reduce the cost of travel arrangements booked in response to a request, such as, for example, credit for any tickets returned by an employee of a particular business entity and/or free tickets earned by a business entity for frequent travel. The business entity profile 20 may also contain the names of all people employed by each business entity customer of the travel agency.

Travel agency profile 22 preferably contains, at a minimum, information relating to the travel agency which can be used to determine the lowest-priced travel arrangements available for a particular request. Travel agency profile information thus may include, for example, any discounts available to the travel agency which can be passed on to its customers (individual and/or business entity). This information can include inventory for sale exclusively by the travel agency (e.g., space banking) and promotional discounts.

The plurality of computer reservation systems 24 used by the travel agency can be linked electronically with system 10. Each computer reservation system 24 may be one or more commercially available computer reservation systems such as, for example, SABRE® owned by American Airlines, WORLD SPAN® owned by Pars Marketing Partnership, APOLLO® owned by Galileo International Partnership, or SYSTEM ONE® owned by Amadeus Global Travel Distribution. Computer reservation systems 24 provide on-line travel service inventory information.

System 10 receives information relating to an incoming travel request from a customer. Typically, this travel request information includes a travel itinerary outlining various parameters for travel, such as, for example, times/dates of travel and the type of travel arrangements (e.g., airline flight, hotel accommodations, rental car, etc.) required. In response to the travel request information, system 10 determines the lowest-priced travel arrangements available that conform to the itinerary.

Figure 2:
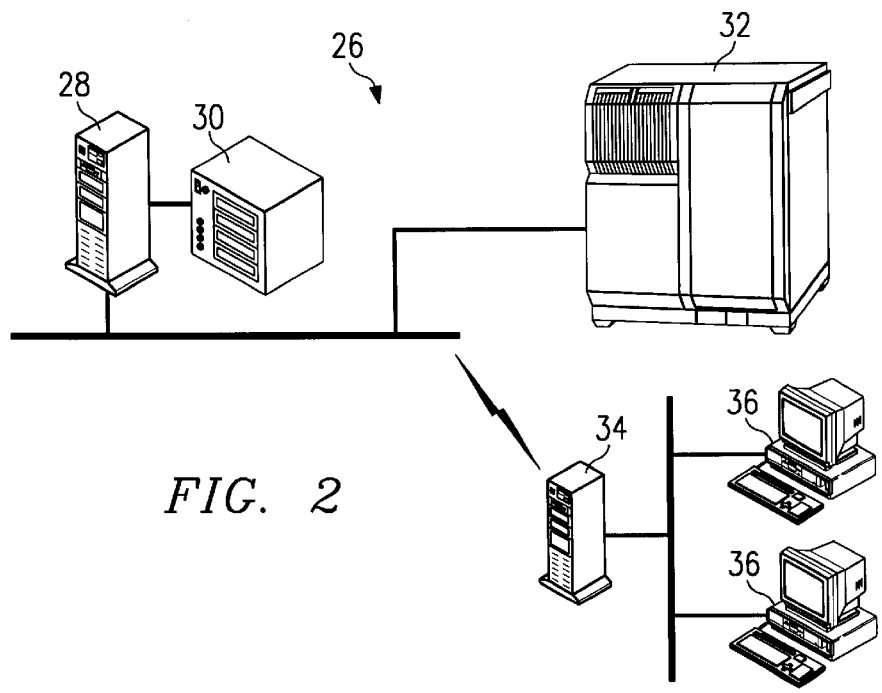
FIG. 2 is a simplified diagram of a computer-based system that can be used to implement the automated travel pricing system shown in FIG. 1.

FIG. 2 is a simplified diagram of an exemplary computer-based system 26 that can be used to implement the automated travel pricing system 10 shown in FIG. 1. Referring to the embodiment shown in FIG. 2, the computer-based system 26 can include a process server 28, a data storage device 30, a main frame computer 32, a local file server 34, and a plurality of work stations or desktop computers 36. Process server 28 preferably functions to process travel-related data and command information. A SUN SOLARIS 2.3 system has been successfully utilized as a process server 28. Data storage device 30 can be a mass storage subsystem of tapes and/or disk drives, which is electronically coupled to process server 28. In the preferred embodiment, a relational database resides in data storage device 30. Consequently, process server 28 may retrieve, process, and store the information in the relational database residing in data storage device 30.

The mainframe computer 32 may be linked electronically to process server 28 through a local or wide area network (LAN/WAN), for automated uploading and downloading of information therebetween. Any general purpose or medium-sized computer, which includes a central processing unit (CPU) and suitable RAM, ROM, and I/O circuitry can be utilized for mainframe 32.

Local file server 34 may be linked electronically to process server 28 by the same or a different local or wide area network, or by telecommunication lines through a modem (not explicitly shown). Additionally, as shown (for illustrative purposes only) in FIG. 2, process server 28 can be linked by a "gateway" interface communications processor to local file server 34. Local file server 34 is preferably connected to a plurality of workstations or desktop computers 36. A user of system 10, such as a travel agent, may input and receive travel-and-customer related information (including the travel plan generated by system 10), and system information, respectively, through any of the workstations 36. Preferably, each workstation 36 is a desktop computer having at least a 486 processor or an operational equivalent. Systems programming for system 10 may be performed using a high level programming language, such as $C^{++}$.

The inventory data structure 18, the business entity profile 20, and the travel agency profile 22 (each of which contains information that can be used to determine lowest-priced, available travel arrangements) are preferably stored in the relational database residing in data storage device 30. Process server 28, mainframe computer 32, local file server 34, and workstations 36 are preferably linked together. Consequently, each of these devices can directly access (e.g., store and retrieve) the lowest-priced travel arrangement information, if necessary.

FIGS. 3 and 4 are flow diagrams illustrating two separate methods that can be performed by automated pricing system 10 during its operation, in accordance with a preferred embodiment of the present invention. Because system 10 preferably includes a plurality of processing devices (as shown in FIG. 2), the two methods can be performed simultaneously, each by a separate processing device in the system. Alternatively, separate processing devices can be used to perform the two methods, but processing is not necessarily simultaneous. In yet another alternative, a single processor may alternately perform both methods.

FIG. 3 is a flow diagram that illustrates a method 100 by which automated travel pricing system 10 periodically obtains information from one or more computer reservation systems 24 and stores the obtained information into database 14. Preferably, method 100 is automatically performed by system 10 without receiving an input from a system user, such as a travel agent.

At block 102, method 100 is initiated. More specifically, system 10 initiates the inventory update sub-module of decision engine module 16, which controls system 10 throughout the performance of method 100.

At block 104, system 10 determines whether a predetermined time has elapsed since inventory information was last obtained from computer reservation systems 24. Preferably, the predetermined time can be set by a user of the system according to the user's needs. For example, a travel agency which desires to have the most current inventory information available can instruct system 10 to access the computer reservation systems twice every hour. On the other hand, a travel agency that wishes to maintain a low hits-to-bookings ratio for each computer reservation system can instruct system 10 to access the computer reservation systems twice each day.

If the predetermined time has elapsed, at block 106, system 10, under the control of the inventory update sub-module, reads data from one or more computer reservation systems 24. If system 10 is connected to more than one computer reservation system 24, data can be read from each computer reservation system sequentially so that only one computer reservation system 24 is accessed at any given moment. Alternatively, system 10 can be configured to read data from a plurality of computer reservation systems simultaneously. The data read from the computer reservation systems 24 includes inventory information, such as, for example, all flights between each city pair, airline carriers providing the flights, fare classes available on the flights, a description of each flight as either direct or non-direct, the breakdown of all non-direct flights into separate segments, and the identification of each segment of a flight as either domestic or international.

At block 108, system 10 updates the inventory data structure 18 in database 14 using the information obtained from computer reservation systems 24. System 10 then waits for the predetermined time to elapse again (block 104).

FIG. 4 is a flow diagram that illustrates a method 200 by which automated travel pricing system 10 can determine the lowest-priced travel arrangement available in response to an itinerary submitted by a customer. During the performance of method 200, a user of system 10, such as a travel agent, can communicate with the system, preferably using a workstation 36. For example, an agent can input system commands and travel request information by pressing appropriate keys (typing) on a workstation keyboard, or "clicking" on an option in a WINDOWS-type display. In return, the workstation 36 can display the lowest-priced travel arrangement determined by system 10.

Referring to FIG. 4, at block 202, method 200 is initiated. More specifically, system 10 initiates the analytical sub-module of decision engine module 16, which controls system 10 throughout the performance of method 200.

At block 204, system 10 receives travel itinerary information, which may be input by a travel agent. The travel itinerary information can include, for example, a departure city and a destination city (a city pair), the times and dates of travel, and the type of travel arrangements needed (e.g., airline flight, hotel, etc.). Furthermore, if the customer is new to the travel agency and is traveling on business, system 10 may prompt the agent to input information relating to the individual customer and the individual's employer, such as, for example, any frequent flyer programs in which the individual participates and any discounts available to employees of the business entity.

At blocks 206, 208, and 210, in response to the travel itinerary information, system 10 retrieves inventory data, business entity profile information, and travel agency profile information from, respectively, inventory data structure 18, business entity profile 20, and travel agency profile 22. It should be understood, however, that if the individual customer is not traveling for work-related matters, business entity profile information preferably is not retrieved and used in the subsequent analysis.

At block 212, using the retrieved inventory data, system 10 identifies all travel arrangements which conform to the received travel itinerary. In other words, system 10 determines all available seating on flights falling within the parameters (i.e., city pairs, dates of travel, etc.) specified in the travel itinerary information. It should be noted that the group of conforming travel arrangements may include more than one fare class of seating for each flight. For example, first class and coach class seats on the same flight may both be included in the group of travel arrangements conforming to the itinerary. At block 214, still under the control of the analytical sub-module, system 10 identifies the airline carrier and fare class for each conforming travel arrangement.

At block 216, using the business entity profile information retrieved from database 14, system 10 identifies which of the conforming travel arrangements are provided by a preferred carrier of any business entity employing the individual traveler. For example, if a corporation specifies that its employees should only travel on American Airlines for work-related matters, system 10 eliminates from consideration all available seating on flights provided by another airline. System 10 also identifies which conforming travel arrangements fall within the business entity's fare class restrictions. Thus, for example, if a company restricts airline travel to business or coach class seats, system 10 will not consider any available first class seats when determining the lowest-priced travel arrangement.

System 10 then determines the prices for the remaining travel arrangements by inputting information relating to these arrangements into one or more pricing routines. Using the pricing information contained in inventory data structure 18 of database 14, the pricing routines price each of these travel arrangements by evaluating various aspects of each arrangement. For example, international segments (i.e., flight legs originating in one country and arriving in another) are priced separately from domestic segments (i.e., flight legs originating and arriving in the same country). Furthermore, different ticketing options, such as, for example, one-way ticketing, round-trip ticketing, city-to-city ticketing, or end-to-end ticketing, are priced separately.

Preferably, system 10 uses case-based reasoning to select which pricing routine or routines are employed to price a particular travel arrangement. In case-based reasoning, the solution to any given problem is derived by comparing that problem to past problems. Fuzzy logic is used to match the current problem to past problems. The current solution is then adapted from the solutions to prior problems that are most similar to the given problem. For example, a current travel arrangement which specifies a one-way, non-direct flight from Los Angeles to London may include a domestic segment from Los Angeles to New York, an international segment from New York to London, and a fare class containing multiple fare basis codes. In response to the current travel arrangement, system 10 identifies one or more "cases" or routines in which travel arrangements are priced by domestic segments, international segments, and/or fare basis. The system then uses these routines to price the current travel arrangement as a whole (i.e., all segments taken together) or by segment.

At block 218, the analytical sub-module of decision engine module 16 directs system 10 to generate a table of the remaining travel arrangements according to the prices determined by the pricing routine(s). The table may be preferably structured to include, at a minimum, the airline carrier for each travel arrangement, the price of each travel arrangement, and the city pairs for all segments of a travel arrangement. The table can be stored in the relational database.

At block 220, using the specialized codes information from business entity profile 20, system 10 automatically applies any applicable business entity discounts to the remaining travel arrangements, thereby reducing the listed rate of some of the arrangements. Because system 10 automatically accounts for the business entity discounts, a user of system 10 is not required to be trained on, or otherwise apply, the various specialized codes that are necessary to determine a lowest-priced travel arrangement.

At block 222, system 10, still under the control of the analytical sub-module, applies any applicable credit for returned and/or free tickets against the price of the travel arrangements in the table. For example, if the individual traveler is employed by a corporation which previously returned several unused tickets to the travel agency, system 10 can apply the credit for the returned tickets against the price of the new travel arrangements, preferably, even if the returned tickets were not issued to the current traveler. Consequently, the business entity will not be required to pay an additional amount if it already has existing credit with the travel agency.

At block 224, system 10 applies any applicable travel agency discounts to the travel arrangements in the table in order to further reduce the listed prices. For example, a particular travel services vendor may offer a one-time promotional discount to a travel agency for a new flight service between the city pairs specified in the traveler's request information. System 10 automatically considers this travel agency promotional discount so that the listed rate of the flight is reduced.

At this point, the prices of the travel arrangements listed in the table should reflect all available discounts, promotions, credits, etc. Thus, at block 226, system 10 selects the lowest-priced itinerary from the table, and outputs this information to the user of the system, for example, by displaying the information at a workstation 36. At block 228, method 200 is terminated. Once the travel agent has informed the customer making the request about the lowest-priced travel arrangements and the customer approves, system 10 may also be used to automatically make the reservations by accessing the appropriate computer reservation system 24.

Although the present invention and its advantages have been described in detail, it should be understood that various changes, substitutions, and alterations can be made therein without departing from the spirit and scope of the invention as defined by the appended claims.

What is claimed is:

1. An automated pricing system for use in a travel agency, comprising:

a database operable to store computer reservation system inventory information and travel agency profile information; and a processor operable to:

retrieve from a plurality of computer reservation systems inventory information comprising an identification of available travel arrangements;

store said inventory information in said database;

in response to receipt of travel request information specifying a travel itinerary, access said database to retrieve computer reservation system inventory information and travel agency profile information; and determine from among the inventory information retrieved from said database using the travel agency profile information, the lowest cost available travel arrangements that conform to said specified travel itinerary.

2. The system of claim 1, wherein said processor is further operable to access said computer reservation system at a predetermined interval.

3. The system of claim 1, wherein said database is further operable to store business entity profile information.

4. The system of claim 3, wherein said processor is further operable to access said database to retrieve business entity profile information in response to receipt of a travel itinerary.

5. The system of claim 1, wherein said processor is operable to process case-based reasoning to determine the lowest cost available travel arrangements that conform to the specified itinerary.

6. The system of claim 1, wherein said processor is further operable to automatically make a reservation for said determined lowest cost available travel arrangements.

7. An automated pricing system for use in a travel agency, comprising:

a database operable to store computer reservation system inventory information and travel agency profile information; and a processing network connected to the database and operable to:

access a plurality of computer reservation systems and retrieve computer reservation system inventory information comprising an identification of available travel arrangements;

store said retrieved computer reservation system inventory information in said database;

receive travel request information specifying a travel itinerary;

access said database to retrieve computer reservation system inventory information and travel agency profile information in response to said received travel request information; and determine from among the inventory information retrieved from said database using the travel agency profile information, the lowest cost available travel arrangements that conform to said specified travel itinerary.

8. The system of claim 7, wherein said processor is further operable to use case-based reasoning to determine the lowest cost available travel arrangements that conform to the specified itinerary.

9. The system of claim 7, wherein said processor is further operable to access said computer reservation systems at a predetermined interval.

10. The system of claim 9, wherein said database is further operable to store business entity profile information.

11. The system of claim 10, wherein said processor is further operable to retrieve business entity profile information in response to said received travel request information.

12. A method for automatically pricing travel arrangements for use in a travel agency, comprising the steps of:

accessing a plurality of computer reservation systems and retrieving computer reservation system inventory information comprising an identification of available travel arrangements;

generating travel agency profile information;

storing said retrieved computer reservation system inventory information and said generated travel agency profile information in a database;

receiving travel request information specifying a travel itinerary;

retrieving said computer reservation system inventory information and said travel agency profile information in response to said received travel request information; and determining from among the inventory information retrieved from said database using the travel agency profile information, the lowest cost available travel arrangements that conform to said specified travel itinerary.

13. The method of claim 12, wherein said accessing step further comprises the steps of accessing the computer reservation system at a predetermined interval.

14. The method of claim 12, wherein said determining step further comprises the step of identifying travel arrangements that conform to said specified travel itinerary.

15. The method of claim 14, wherein said determining step further comprises the step of applying at least one of a plurality of pricing routines to price said identified travel arrangements.

16. The method of claim 15, wherein said determining step further comprises the step of using case-based reasoning to select said at least one of a plurality of pricing routines.

17. The method of claim 12, further comprising the step of generating business entity profile information.

18. The method of claim 17, further comprising the step of retrieving said business entity profile information in response to said received travel request information.

* * * * *